United States Patent [19]

Sterling

[11] 4,131,257
[45] Dec. 26, 1978

[54] STACKING CABLE CLAMP

[75] Inventor: Maurice Sterling, Willow Grove, Pa.

[73] Assignee: Eby Company, Philadelphia, Pa.

[21] Appl. No.: 851,137

[22] Filed: Nov. 14, 1977

[51] Int. Cl.² .................... F16L 3/10; H01R 7/24
[52] U.S. Cl. .................... 248/67.5; 24/81 CC; 248/68 CB; 339/246
[58] Field of Search ............. 248/67.5, 68 R, 68 CB, 248/74 R; 174/94 S, 156, 157; 339/246, 263 L, 249 A; 24/73 SA, 81 CC, 81 KK

[56] References Cited

U.S. PATENT DOCUMENTS

| 1,176,801 | 3/1916 | Williams | 174/157 |
| 2,044,679 | 6/1936 | Frese | 339/246 X |
| 2,081,047 | 5/1937 | Basch | 174/94 S |
| 2,791,623 | 5/1957 | Lock et al. | 174/94 S |
| 2,963,679 | 12/1960 | Jugle | 339/246 |
| 3,023,989 | 3/1962 | White | 248/68 CB |
| 3,146,982 | 9/1964 | Budnick | 248/68 CB |
| 3,198,464 | 8/1965 | Huggins | 248/67.5 |
| 4,037,810 | 7/1977 | Pate | 248/68 CB |

FOREIGN PATENT DOCUMENTS

| 226028 | 11/1958 | Australia | 174/94 S |
| 1174119 | 7/1964 | Fed. Rep. of Germany | 339/246 |
| 2341447 | 2/1975 | Fed. Rep. of Germany | 248/74 R |
| 431569 | 7/1935 | United Kingdom | 174/157 |

Primary Examiner—Rodney H. Bonck
Attorney, Agent, or Firm—Stanley Bilker

[57] ABSTRACT

Cable clamp with laterally spaced pairs of "pigeon hole" jaws at interfaces of top, bottom and intermediate clamping blocks assembles into a stacked array by a threaded bolt. Each jaw comprises a notched, preferably V-notched, male portion interfitting loosely within an undercut, preferably V-ground, female portion through a specially designed lateral clearance permitting each block to skew to a limited extent for clamping cables of unequal diameters of any interface. Medial shoulders at each interface act as bottoming stops at each level to provide a multi-stacking array which provide controlled float and compression without pinching.

5 Claims, 4 Drawing Figures

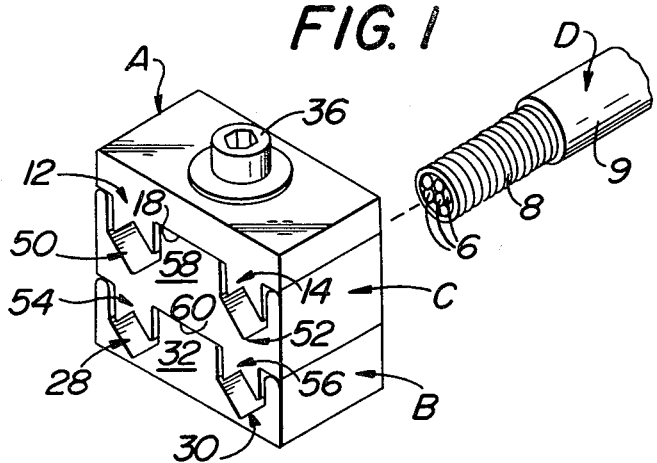
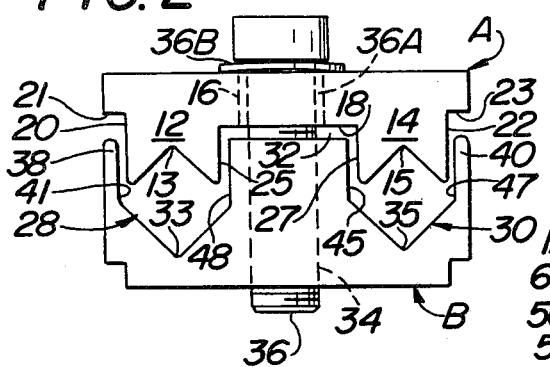
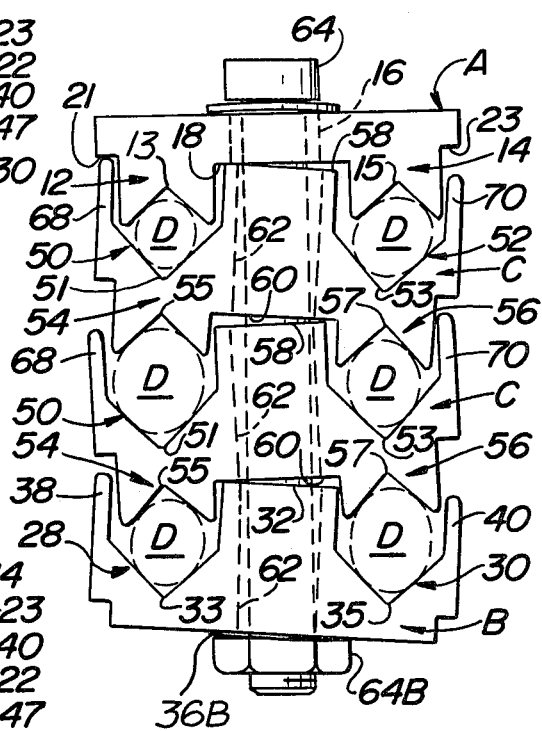

4,131,257

STACKING CABLE CLAMP

SUMMARY OF THE INVENTION

This invention relates to cable clamps and more particularly relates to a clamp connector which is adapted to mechanically retain a plurality of electrical cables in fixed disposition with respect to each other and to couple simultaneously the conductive shields of such cables, when desired to a common electrical ground, all while acting as a mechanical strain relief.

BACKGROUND OF THE INVENTION

In the electrical field, especially in telephone communication, it is frequently desirable to clamp a plurality of cables in fixed disposition with respect to each other and to couple simultaneously the encircling conductive shield of these cables to a common electrical ground. Such cables usually comprise a bundle of individual insulated wire conductors that are encased within an outer insulative covering extruded about a braided or tubular metallic sheath, preferably copper, which acts as an electrical shield for transmissions through the wire conductors themselves. The cables per se are of various diameters depending upon the number and gauge of the individual wire conductors and it may be necessary to clamp two or more cables of unequal diameter in spaced configuration with each other at the same time. However, in the instance of the encapsulating shield type of cables especially, it is important that all of the cables being gripped within the cable clamp be retained with relatively uniform pressure within the clamp jaws regardless of the cable diameter without pinching or overclamping, either of which could fracture any of the individual elements or cause shorting of the inner wire conductors themselves or the electrical shield enclosing them.

It is therefore an object of this invention to provide a cable clamp for retaining at least two cables of unequal diameter in spaced fixed disposition with respect to each other.

Another object of this invention is to provide a cable clamp having a plurality of jaws of equal size which can clamp with uniform pressure without overclamping or pinching a plurality of cables of unequal diameter.

Another object of this invention is to provide a cable clamp having a plurality of dual jaw elements which are adapted to be stacked together, as desired, to accommodate cables of different diameters at the various levels or at the same interface.

Another object of this invention is to provide a cable clamp for gripping a plurality of cables in fixed disposition while acting as a mechanical strain relief for the individual wire elements within the cable jacket.

Other objects of this invention are to provide an improved device of the character described, which is easily and economically produced, sturdy in construction, and highly efficient and effective in operation.

DESCRIPTION OF THE FIGURES

With the above and related objects in view, this invention consists of the details of construction and combination of parts as will be more fully understood from the following detailed description when read in conjunction with the accompanying drawings, in which:

FIG. 1 is a perspective view of a cable clamp embodying this invention.

FIG. 2 is an end view thereof in open position.

FIG. 3 is an end view of the clamp retaining a pair of cables of unequal diameter.

FIG. 4 is an end view of a stackable cable clamp of this invention retaining pairs of unequal diameter cables at multilevels.

DESCRIPTION OF THE INVENTION

Referring now in greater detail to the drawings in which similar reference characters refer to similar parts, I show a cable clamp comprising a first outer clamping block or upper jaw member, generally designed as A, a second outer clamping block or lower jaw member, generally designated as B, and, as desired, one or more intermediate clamping blocks constituting stackable jaw members, generally designated as C. The various jaw members A, B and C are preferably of conductive material, such as aluminum, brass or steel, and are adapted to peripherally embrace a single or pairs of multiple conductor electrical cables D of unequal diameter within diamond shaped jaws or pigeon holes laterally spaced from each other at the interface of adjacent blocks or to permit clamped stacking of an array of the same or different diameter cables D at the various levels.

The cables D may be at any diameter within prescribed limits for a particular size clamp and in general includes a plurality of insulated wire conductors 6 encapsulated within an inner insulated sheath 7. A copper shield 8 surrounds the inner sheath 7 and also acts as a grounding means. About the copper shield 8 is extruded one or more layers of an insulating cover 9 which is stripped away at intervals to expose the segment of the copper shield that is gripped within the jaws of the clamp. The diameter of one cable D is usually dependent upon the number and guage of the individual conductors 6.

In FIGS. 2 and 3, there is illustrated merely the top and bottom clamping blocks or jaws A and B for retaining a pair of cables D in clamped disposition with controlled compression and without accidental pinching. The upper jaw A is of generally block shaped configuration and includes a pair of laterally-spaced, longitudinally extending projections 12 and 14 which define male portions that are generally symmetrically arranged about a central bored hole 16. A depressed portion 18 intermediate the projections 12 and 14 acts as a stop or bottoming limit for the lower clamping block B (or one of the intermediate clamping blocks C when utilized). The male portions 12 and 14 are of substantially equal size and include V-shaped notches 13 and 15 respectively at the ends thereof running longitudinally with the projections. The outboard walls, 20 and 22 of the male projections 12 and 14 are inwardly recessed from the lateral edges of the clamping block A to define shoulders 21 and 23 which are undercut to a greater extent than depression 18. Interior walls 25 and 27 of the male portions 12 and 14 from the margins of the depression 18.

The bottom jaw member B, also of block configuration, includes a pair of laterally spaced grooves 28 and 30 which act as longitudinally extending female portions in registration with and adapted to receive the male portions 12 and 14. Intermediate the grooves 28 and 30 is a boss 32 through which extends a hole 34 that may be tapped to receive clamp bolt 36. The grooves 28 and 30 have V-shaped notches 33 and 35 longitudinally extending across the bottoms thereof and which form diamond-shaped pigeon holes or jaws with the notches 13 and 15 of the male members 12 and 14 when the latter are inserted within the female portions. Lateral guides 38 and 40 define the outer margins of the female portions 28 and 30 and interfit within the recesses at the lateral edges of the upper jaw member A without ever abutting the shoulders 21 and 23 thereof. The female portions are also of substantially equal size but the width across side walls 41 and 43 of groove 28 is greater by a predetermined degree than the width across side walls 20 and 25 of male member 12 while the width across side walls 45 and 47 of groove 30 is greater by a predetermined degree than the width across side walls 22 and 27 of male portion 14 so as to allow the pair of the male members to rack with respect to the female members. This clearance is specially designed along with the clearance between shank 36A of bolt 36 and bore 16 to permit the symmetrically disposed pigeon hole jaws and surfaces 18 and 32 to skew slightly with respect to each other to accommodate, within limits, for unequal diameter cables D. That is, the clearance between walls 20–41, 25–48, 27–45 and 22–47 allows a controlled float whereby the jaws on each side can tolerate different wire diameters while at the same time, the side guides 38 and 40 prevent pinching of the cables during clamping thereof. Abutment of the boss 32 against stop 18 prevents overclamping so that a controlled compression up to a maximum can be applied at each pigeon hole for a wide range of cable sizes. A belville washer 36B acts as a compression lock under the head of bolt 36 when the latter is threaded into tapped hole 34.

Referring now to FIG. 4, there is shown a pair of intermediate clamping blocks C snadwiched between the upper clamping block A and lower clamping block B whereby six cables D of different diameters may be retained at one various levels. However, it is to be noted that any reasonable number of intermediate jaws C can be employed.

Each intermediate clamping block C includes a pair of laterally spaced longitudinally extending grooves 50 and 52 which are in essence identical to the female portions 28 and 30 and are adapted to receive the male portions 20 and 22 of upper jaw A or male portions 54 and 56 projecting from one opposite surface of an identical block C. V-notches 51 and 53 are formed in the bottom portion of female grooves 50 and 52 and correspondingly V-notches 55 and 57 are longitudinally cut in the tips of the male portions 54 and 56. A flat rib 58 (identical to boss 32 on bottom jaw B) projects upwardly from between the female portions 50 and 52 while a socket 60 (identical to depression 18 in upper jaw A) is formed between the male portions 56 in the lower surface of each clamping block C. Each of the intermediate clamping jaws C includes a bore 62 for freely receiving a bolt 64 which either threads into tapped hole 34 in bottom clamping jaw B or is engaged by a nut 64B. In either event, the shank 64A of bolt 64 is sufficiently smaller than bore 62 as to provide a controlled clearance for skewing.

As in the case of the male and female portions of the top and bottom jaws A and B, the width across the order margins of the male members 54 and 56 is to a predetermined extent lesser than the width across the inner margins of the female members 50 and 52. In this manner, cables D of various and unequal diameters may be retained within the jaws at any level by virtue of the designed clearance which permits any clamping block A, B or C to rock with a controlled float with respect to its interfacing element. Side guides 68 and 70 again by way of the clearances provided prevent pinching of the cable during clamping. Each intermediate jaw C also combines the diamond shaped pigeon hole clamping arrangement which allows for controlled compression of the cables for a wide range of diameters until bottoming is produced when abutment of the stops at any level occurs.

As set forth hereinabove, the male notches 15, 15, 55 and 57 and the female grooves 33, 35, 51 and 53 have been shown and described as being preferably of Vee-configuration. However, it is also apparent that these respective notches and grooves may be of multi-faceted or of arcuate disposition.

Although this invention has been described in considerable detail, such description is intended as being illustrative rather than limiting since the invention may be variously embodied without departing from the spirit thereof, and the scope of the invention is to be determined as claimed.

What is claimed is:

1. A cable clamp comprising first and second outer jaw members and at least one intermediate jaw member adapted to be retained between said first and second outer jaw members, each said intermediate jaw member including a pair of spaced female portions contained within one side thereof and a pair of spaced male portions projecting from an opposite side thereof, said first outer jaw member including a pair of spaced male portions, said second outer jaw member including a pair of spaced female portions, said pairs of male portions loosely interfitting within corresponding pairs of female portions and including abutting limit stops at the interfaces therebetween, V-shaped notches longitudinally extending in each of said male portions, and V-shaped grooves longitudinally extending in each of said female portions to define diamond shaped pigeon hole jaws when said male and female portions interfit with each other, lateral guides at the outer margins of each of said female portions, and bolt means loosely passing through bores in said first and second outer jaw members and said intermediate jaw members for drawing said members together whereby a plurality of cables of different diameters can be stacked in fixed disposition with each other without pinching.

2. A cable clamp comprising first and second outer jaw members and at least one intermediate jaw member adapted to be retained therebetween, each said intermediate jaw member including a pair of spaced female portions contained within one side thereof and a pair of spaced male portions projecting from the opposite side thereof, said first outer jaw member including a pair of spaced male portions and said second outer jaw member including a pair of spaced female portions, said pairs of male portions loosely interfitting within corresponding pairs of female portions and including abutting limit stops at the interfaces therebetween, notches at opposing surfaces of interfitting male and female portions to define pigeon hole jaws when said male and female portions interfit with each other, lateral guides at the outer margins of each of said female portions, and bolt means loosely passing through bores in each of the jaw members for drawing said members together whereby a plurality of cables of different diameter can be grasped in fixed stacked disposition without pinching.

3. The clamp of claim 2 wherein the male portions include flat parallel exterior walls adapted to tilt within corresponding flat parallel interior walls of said female portions.

4. The clamp of claim 2 wherein the notches at the opposing surfaces of interfitting male and female portions are of Vee-shaped configuration to define diamond shaped jaws.

5. The clamp of claim 2 including washer means cooperating with said bolt means to provide a constant compression lock.

* * * * *